Patented June 2, 1953

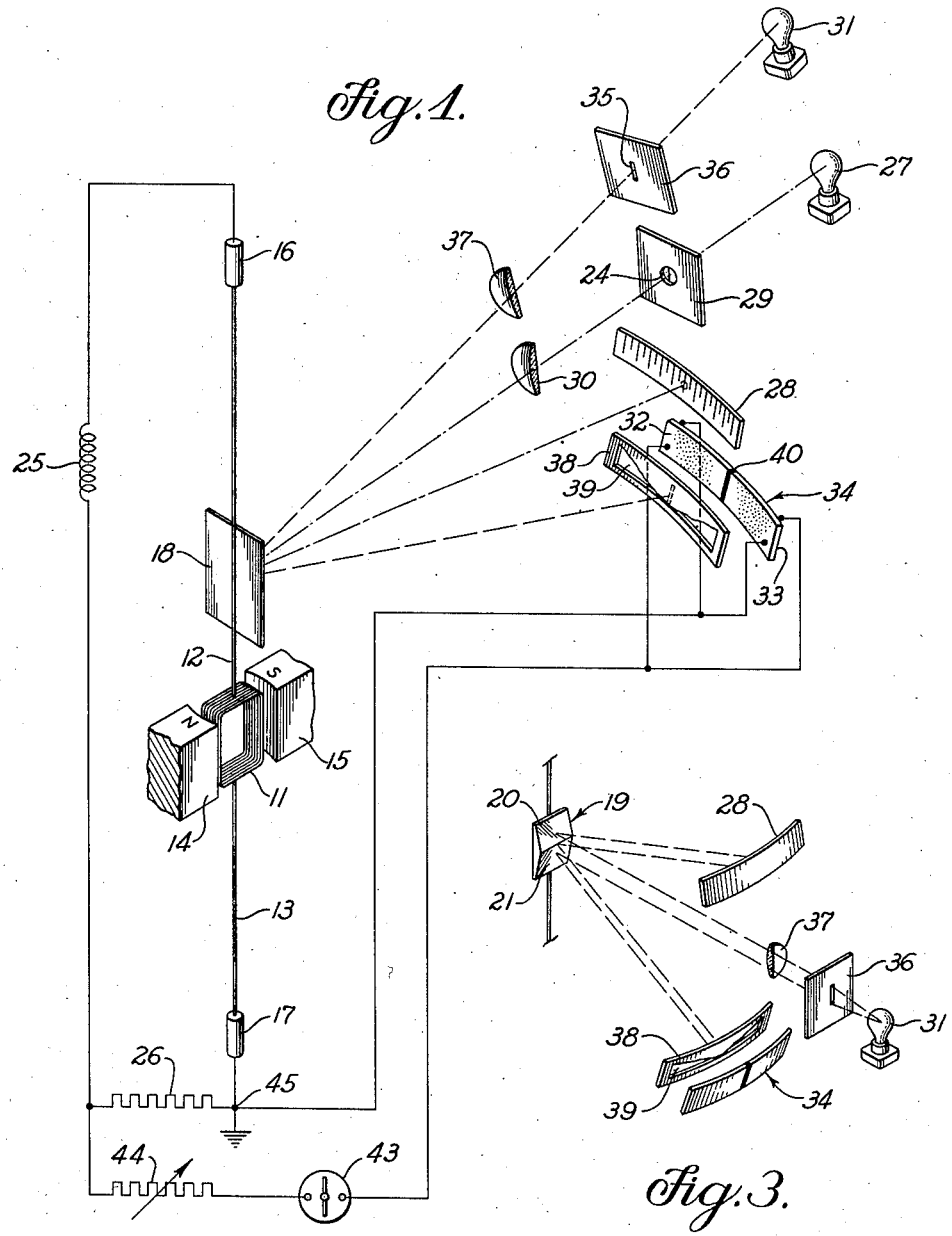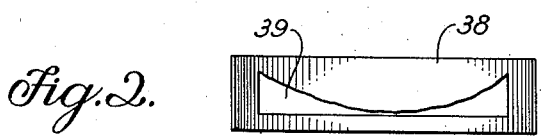

2,640,866

UNITED STATES PATENT OFFICE 2,640,866

TORQUE COMPENSATED GALVANOMETER

Wilson M. Powell, Berkeley, Calif., assignor to the United States of America as represented by the United States Atomic Energy Commission Application March 8, 1949, Serial No. 80,303

3 Claims. (Cl. 171—95)

This invention relates to galvanometers and fluxmeters and, more particularly, to an improved means for compensating for the normal restoring torque of the usual torsional coil suspension employed in apparatus of this type.

Suspension-type galvanometers are well known in which the suspended element has the restoring torque of the suspension reduced or partially nullified. However, so far as known, no galvanometer or fluxmeter has heretofore been accurately and fully compensated in all positions of deflection range for the residual torque tending to return the moving coil to zero. This problem has long been recognized and one type of conventional solution provided by the known art is shown in the Gardner Patent 2,356,579, and in the Rich Patent 2,326,252, in both of which a small, permanent, compensating magnet is mounted on the suspension means within the fringing field of the main field-magnet poles. The polarity of this small compensating magnet is such as to provide a torque to substantially counteract that of the restraining torque of the suspension whenever the moving coil and compensating magnet are angularly displaced from their positions of rest. Use of the compensating magnet aids in neutralizing the restoring torque in some positions; however, since the magnetic force between magnets and the torsional force of the galvanometer suspension vary as different functions of the moving coil displacement, absolute compensation in all positions of deflection range is not possible. My invention overcomes the above objection or problem by the introduction of a current into the moving coil which is proportional to the angular deflection of the coil and is of such a polarity as to effectively neutralize the restoring torque for all positions of deflection range of the moving coil, thus obviating the necessity for use of the separate compensating magnet. In my invention a combination of an optical and photoelectric system is utilized in conjunction with the electrical circuit of the galvanometer wherein the angular deflections of the moving coil of the galvanometer cause a mirror rigidly mounted on the same suspension axis as the movable coil to reflect a beam of light onto a photoelectric strip. A mask is interposed between the mirror and the photosensitive strip and having an aperture of varying width so as to permit an amount of light which varies in proportion with the angular displacement of the coil to fall on the photoelectric strip. The current produced by the photo-strip thus varies in accordance with coil deflection and is applied to the coil with a polarity such as to counteract and thereby neutralize the inherent restoring torque of the suspension.

The suspension-torque neutralizing system herein described has been found to be particularly useful in the permanent magnet type of galvanometer and fluxmeter. However, the invention is not limited to embodiment in only the above type of galvanometer, since it may be applied also to galvanometers with opposing coils and others operating on like principles.

It is, therefore, an object of my invention to provide an improved ballistic galvanometer with the restoring torque of the coil suspension neutralized.

Another object of my invention is to provide, in combination with a fluxmeter or galvanometer, an improved means for neutralizing the restoring torque of the movable element.

Still another object of my invention is to provide a photoelectric device to be used with a fluxmeter or galvanometer to compensate for the restoring torque of the rotatable element. My invention has for a further object the provision of an improved combination of a photoelectric device with a fluxmeter of the galvanometer type for the compensation of any non-linear characteristic of the moving coil suspension.

A better understanding of the invention will be afforded by the following detailed description considered in connection with the accompanying drawings, in which:

Figure 1 is a schematic drawing which illustrates a suspension galvanometer of the light beam indicating type equipped with a divided photo-cell onto which the deflected light beam is directed. Fig. 2 is a view of a suitable type of mask adapted to be interposed between the light source and the photo-cell. Fig. 3 represents a modification of the mirror system of Fig. 1 utilizing a double-planed mirror mounted on the suspension and requiring only a single source of light.

Attention is now directed to Fig. 1 of the drawings where I have represented a conventional moving coil galvanometer used as a fluxmeter. A moving coil 11 is suspended by torsion wires 12 and 13 between the poles of a pair of permanent magnets 14 and 15. Upper and lower electrically conductive suspension supports 16 and 17 for the moving coil 11 conduct energizing current thereto through torsion suspension wires 12 and 13. The suspension also carries a small, light weight mirror 18 attached to upper wire 12 in any conventional manner, such as with cement.

A flux-search coil 25 in series with a voltage-dropping resistor 26 is connected across coil 11 through electrically conductive supports 16 and 17 and torsion wires 12 and 13. Any change in magnetic flux through search coil 25 generates a current in the search coil which when applied to coil 11, results in an angular deflection of the coil 11 and a consequent proportional deflection of mirror 18. The amount of angular deflection is indicated in a conventional manner by a beam of light from a lamp 27 reflected on a scale 28 by mirror 18. The beam is collimated through an aperture 24 in a light-proof lamp cover 29 and focused on the scale 28 by a lens 30.

To provide compensation for the inherent restoring torque of the moving coil, a separate light beam arrangement preferably employing the same mirror may be used and consists of the movable mirror 18 for reflecting a beam of light from a lamp 31 to a divided photo-cell device 34 having light-sensitive cells 32 and 33. The beam of light is collimated through a narrow rectangular aperture 35 in a light-proof lamp cover 36 and is focused on the photo-cell device by means of a lens 37. Disposed in the path of this latter light beam between the mirror 18 and the photo-cell device 34 and preferably lying against the photo-cell device 34, is an insulating light-proof mask 38 of a suitable light-proof material, such as black paper, adapted to shield the photo-cell 34. It is significant to note that mask 38 has a longitudinal opening 39 of varying width such that the amount of light impinging on the photo-cell device 34 will vary with the angular deflection of the light beam by mirror 18 and coil 11 in a manner later to be described. Between photo-cells 32 and 33 is a nonconductive connecting strip 40 as for example, of rubber or wood, which secures cells 32 and 33 together and is of approximately the same width as that of the light beam. The coil 11 is in a neutral of zero position when mirror 18 reflects the beam of light on only connecting strip 40 and consequently does not activate either cell 32 or 33.

The electrical connections to photo-cells 32 and 33 are connected differentially in parallel, such that the current output of cell 32 is of opposite polarity to the current of cell 33. This differential current is applied to resistor 26 through a single pole, single throw snap switch 43 and a variable resistor 44 in series. The electrical circuit is grounded at a point 45 to prevent any body-to-ground capacity of the operator from affecting the accuracy of the readings. All of the elements are physically supported in any conventional manner, and, if desired, may be integrally combined with the mechanical structure of the galvanometer, as for example, in the same housing.

Referring now to Fig. 2 which shows the improved mask, it is desired that the amount of light impinging on the photoelectric device be exactly proportional to the restoring torque of the suspension for any displacement from the neutral position of the moving coil. Accordingly, a curve can be plotted of the angular displacement of the moving coil and mirror versus the unidirectional voltage required to hold the coil and mirror in said displaced position when no restoring torque compensating means are used. This curve is plotted both positively and negatively and preferably using equal increments of applied unidirectional voltage on the graph ordinate as the independent variable and the angular deflection of the coil and mirror on the graph abscissa as the dependent variable. The space under the curve thus determined, i. e., between the curve and the abscissa, represents an area which increases from the neutral, or zero, position directly in proportion to the restoring torque of the coil and mirror suspension. If now a light-proof mask is made having an opening proportional to the above-determined area under the curve, and it is placed between the photo-device 34 and mirror 18, the amount of light impinging on the photo-device will be directly proportional to the suspension restoring torque for any position. The shape of opening 39 will differ somewhat for every galvanometer, since no two galvanometers are ever identical in all electrical, magnetic, and mechanical characteristics. Accurate and full torque compensation will be possible, since it is practicable to compensate completely for extraneous nonlinear characteristics such as might be present in the magnet, torsion suspension, and those due to thermal changes of resistance. Thus, the shape of opening 39 provides for the passage of an amount of light at any angular deflection of the moving coil within its deflection range proportional to the restoring torque of the moving coil. Fig. 3 illustrates one modification of my invention using a mirror 19 having two non-parallel planes 20 and 21 to split the beam from a single lamp 31 into two beams for use on scale 28 and photo-cell device 34.

In carrying out the invention as above described for the purpose of measuring a magnetic flux, switch 43 is closed and search coil 25 is moved through a magnetic field to be measured. The cutting of the magnetic flux lines by coil 25 induces an instantaneous current in the flux search coil 25 which is transmitted to the moving coil 11 through the voltage dropping resistor 26 and torsion wires 12 and 13. The interaction of the magnetic flux due to the current flow in coil 11 and that of field magnets 14 and 15, angularly displace coil 11 and mirror 18. The degree of angular displacement is indicated in a conventional manner by the displacement of the indicating beam on the scale 28. Assuming the angular displacement of mirror 18 to be clockwise, the beam will be reflected clockwise onto photo-cell 33 through mask 38. The beam of light generates a constant current in photo-cell 33 which flows through switch 43, variable resistor 44, and resistor 26, and a fixed part of which also flows through moving coil 11 in the same direction as that of the instantaneously induced voltage from coil 25. The amount of current flow through coil 11 from photo-cell 33 is regulated by the amount of light passing through the opening 39 of mask 38 and varies directly as the restoring torque for any position of angular displacement within the deflection range. Photo-cell 33 thus generates just enough current to hold coil 11 stationary without drift against the restoring torque at any angular position within said deflection range. When search coil 25 is withdrawn from the magnetic field and returned to its initial position, the induced current in the search coil 25 is of the opposite direction and will return coil 11 to the neutral or zero position.

The function of variable resistor 44 is to balance and adjust for variation in output current of different photo-cell devices and for variations in lamp intensity. Switch 43, when open, allows the fluxmeter to act as a conventional galvanometer, if desired, since the torque neutralizing current of the photo-cell device is then no longer applied to coil 11. A galvanometer thus equipped with this invention is readily converted into an efficient integrator for magnetic fields and eliminates the need for delicate and expensive low torsion mounting and construction.

The essential elements of the invention can also be applied to any galvanometer, even those of the opposing coil type, for which full or partial restoring torque compensation is required, so as to convert any galvanometer into a ballistic galvanometer with zero or as little restoring torque as desired.

While I have described what at present is considered the preferred embodiments of the invention, it will be obvious to those skilled in the art that various changes and modifications may be made without departing from the same, and the invention therefore should be restricted only in so far as set forth in the following claims.

What is claimed is:

1. A fluxmeter comprising a galvanometer having a stationary permanent magnet field and a coil mounted for angular deflection about its axis from a zero point within said field, means torsionally suspending said coil and establishing a restoring torque proportional to the angle of displacement of the coil from its zero position, a pair of electrically separated photocells each of which has an effective area of light reception which increases in a direction away from the other photocell according to the angle of deflection of the galvanometer coil, a light source, a mirror attached to said suspending means and adapted to reflect light upon one or the other of said cells, a search coil connected to said galvanometer coil and adapted to transmit to the galvanometer a coil-deflecting current, and connecting means for differentially coupling the output from said photocells to said galvanometer coil for supplying a continuous torque compensating current thereto while light is applied to said cells whereby said compensating current acts in opposition to the direction of said restoring torque and is proportional to the amount of deflection of the galvanometer coil from its zero position.

2. Apparatus as defined in claim 1 wherein a grounded voltage-reducing resistor is interposed between said search coil and said galvanometer coil.

3. Apparatus as defined in claim 1 wherein the light path to each of said photocells is intercepted by a mask having a generally triangular aperture which increases in area in a direction away from the other photocell.

WILSON M. POWELL.

References Cited in the file of this patent

UNITED STATES PATENTS

| Number | Name | Date |
|---|---|---|
| 1,743,792 | Moeger | Jan. 14, 1930 |
| 1,937,754 | Gieskieng | Dec. 5, 1933 |
| 2,136,682 | Gilbert | Nov. 15, 1938 |
| 2,329,423 | Steghart | Sept. 14, 1943 |
| 2,356,579 | Gardner | Aug. 22, 1944 |
| 2,367,614 | Rich | Jan. 16, 1945 |
| 2,483,644 | Kelsey | Oct. 4, 1949 |
| 2,491,305 | Faus | Dec. 13, 1949 |
| 2,560,257 | Sias | July 10, 1951 |